United States Patent [19]

Wine

[11] 4,418,364
[45] Nov. 29, 1983

[54] VIDEO PLAYER APPARATUS HAVING CAPTION GENERATOR

[75] Inventor: Charles M. Wine, Princeton, N.J.

[73] Assignee: RCA Corporation, New York, N.Y.

[21] Appl. No.: 306,474

[22] Filed: Sep. 28, 1981

[51] Int. Cl.³ .............................................. H04N 5/91
[52] U.S. Cl. .................................... 358/336; 358/335
[58] Field of Search .................... 360/14.1, 14.2, 14.3, 360/38.1, 33.1; 358/311, 314, 319, 336, 342, 22, 183, 148, 337, 320; 340/715, 814

[56] References Cited

U.S. PATENT DOCUMENTS

| | | | |
|---|---|---|---|
| 3,898,377 | 8/1975 | Fairbairn et al. | 358/148 X |
| 4,122,488 | 10/1978 | Mikado | 358/19 |
| 4,157,572 | 6/1979 | Kennedy et al. | 358/183 X |
| 4,203,130 | 5/1980 | Doumit et al. | 358/183 X |
| 4,306,250 | 12/1981 | Summers et al. | 358/148 |
| 4,315,276 | 2/1982 | Harada et al. | 358/314 |
| 4,325,080 | 4/1982 | Satoh | 360/14.3 |

*Primary Examiner*—Stuart N. Hecker
*Assistant Examiner*—Donald McElheny, Jr.
*Attorney, Agent, or Firm*—E. M. Whitacre; J. S. Tripoli; R. G. Coalter

[57] ABSTRACT

A composite video signal including a timing component and a caption video signal having no timing component are combined to form a resultant video signal for application to a television receiver. The caption signal is produced by a character generator that is normally synchronized with the timing component of the composite video signal. A substitute timing signal is supplied to the character generator and also added to the player output signal under conditions which interrupt the timing component of the composite video signal whereby captions may be continuously displayed on the television receiver notwithstanding partial or total interruption of the composite video signal.

9 Claims, 1 Drawing Figure

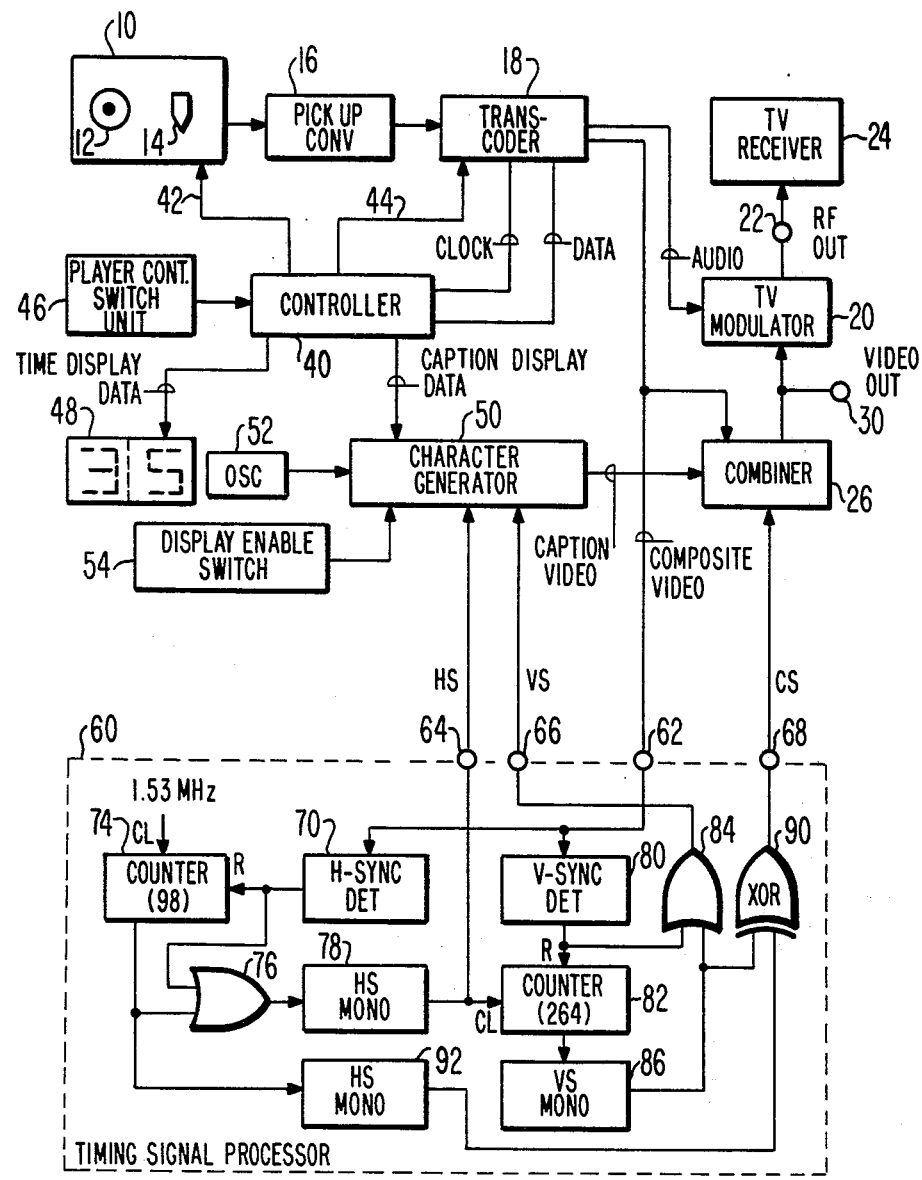

VIDEO PLAYER APPARATUS HAVING CAPTION GENERATOR

FIELD OF THE INVENTION

This invention relates to video player apparatus and particularly to video disc or tape players having caption generators for providing a composite video output signal inclusive of picture, caption and timing components for display on the screen of a television receiver.

BACKGROUND OF THE INVENTION

Video disc players have been proposed in which data (e.g., video frame identification numbers, record band numbers, etc.) is recovered from the record being played, processed by a microprocessor and applied to a display device connected to the player. An example of such a player is described in the U.S. patent application of Rustman et al., Ser. No. 084,386 entitled "Track Error Correction System for a Video Disc Player" filed Oct. 12, 1979 now U.S. Pat. No. 4,313,134. In the Rustman et al. player, a microprocessor calculates the playing time of a video disc record from video frame identification data present in the composite video signal recovered from the record. The playing time is then applied to a two digit seven segment light emitting diode (LED) display on the player to provide a visual indication to the user of the elapsed disc playing time. By this means, a user may easily locate a particular portion of a record for viewing.

An advantage of the kind of player proposed by Rustman et al. is that the displayed data is stored in the microprocessor memory and is thus continuously available for display even when the recovered composite video signal is partially or totally interrupted. Partial interruption may occur, for example, when the player pickup transducer encounters a defect in the record. Total interruption may occur when the player is placed in a "pause" operating mode and the video output signal is squelched to avoid the appearance of noise "snow" in the displayed picture when no signal is being recovered from the record. An example of a video disc player having such a squelch feature and which additionally lifts the playback stylus from the record in the pause operating mode to avoid unnecessary record wear is described in U.S. Pat. No. 4,286,290 of Pyles et al., entitled "Fast Recovery Squelch Circuit for a Video Disc Player" which issued Aug. 25, 1981.

Notwithstanding its advantage in providing a continuous display of data, for practical reasons an LED display is relatively limited in terms of the number of characters and character fonts which may be displayed. This shortcoming may be overcome by either replacing or supplementing the LED display with a character generator that converts the data to a raster scan video format for display as a caption along with the "picture" video signal on a television receiver used with the disc player. Video character generators are well known and have heretofore been used in television receivers, for example, for adding time or channel captions to the displayed picture. At least one video disc player is commercially available which includes a character generator for adding "chapter" and "frame number" captions to the player video output signal. However, in the known player squelch circuitry inhibits the video output signal when the pause key is pressed and no video image is reproduced on the associated TV receiver.

SUMMARY OF THE INVENTION

Summarizing, briefly, players having "on screen" display captions have an advantage in terms of the number of characters and character fonts which may be displayed. Players having integral LED displays have an advantage in that the display data is continuously visible to the user even in the pause mode of operation. It is an object of the present invention to provide a video player (for records or tapes) having the capability of continuously displaying captions which may have a full alpha-numeric font on the screen of an associated television receiver even though the video signal recovered from the recording medium (tape or disc) is partially interrupted (due to noise, for example) or totally interrupted (as during the pause mode of operation, for example) for indefinite periods of time.

Video player apparatus embodying the invention includes a signal recovery means for normally producing a composite video signal inclusive of timing pulses but being subject to partial or total interruption and a character generator means responsive when activated for producing a caption video signal devoid of timing pulses. A timing signal processor means, operative when the timing pulses are present, applies the timing pulses to the generator means to synchronize the caption video signal with the composite video signal. When the timing pulses are interrupted, the timing signal generator means is operative for producing substitute pulses of substantially the same frequency as the normally produced timing pulses and supplies the substitute pulses to the character generator means for synchronizing the caption video signal with the substitute pulses. Circuit means combines the composite video signal, the caption video signal and the substitute pulses to provide a resultant video output signal in which missing ones of the timing pulses are replaced with corresponding ones of the substitute pulses. Output means applies the resultant video output signal to an output terminal for connection to a television receiver whereby captions may be continuously displayed on the receiver notwithstanding the partial or total interruption of the composite video signal produced by the signal recovery means.

BRIEF DESCRIPTION OF THE DRAWING

The sole FIGURE is a block diagram of a video disc player embodying the invention.

DETAILED DESCRIPTION

The player comprises a turntable mechanism 10 for rotating a video disc 12 and a pickup transducer 14 for recovering information signals from the disc. Illustratively, it will be assumed that the player is intended for use with records in which information is stored in the form of topological variations and recovered by sensing capacitance variations between a stylus in transducer 14 and the record 12. The output of transducer 14 is coupled to the input of a pickup converter 16 which comprises a capacitance-to-voltage converter responsive to capacitance variations between a stylus in transducer 14 and the record being played for producing an FM output signal voltage representative of the recorded information. Such records and suitable circuits for implementing the capacitance-to-voltage conversion functions of pickup converter 16 are well known. See, for example, U.S. Pat. No. 3,783,196 entitled "High Density Capacitive Information Records and Playback Apparatus Therefor" which issued to T. O. Stanley, Jan. 1, 1974; U.S. Pat. No. 3,842,194 entitled "Information Records and Recording/Playback Systems Therefor" which issued to J. K. Clemens, Oct. 15, 1974; and U.S. Pat. No. 4,080,625 entitled "Pickup Circuitry for a Video Disc Player with Printed Circuit Board" which issued to Kawamoto et al., Mar. 21, 1978.

The output of converter 16 is applied to a transcoder 18 which processes the FM signal to provide a baseband audio signal and a baseband composite video signal inclusive of horizontal synchronizing or "timing" pulses (HS) and vertical synchronizing or "timing" pulses (VS). The transcoder also has an input for receiving a squelch signal for inhibiting or muting the audio and composite video output signals when the squelch signal is present. Pyles et al., in their aforementioned U.S. patent, discloses a suitable implementation of transcoder 18 which also includes timebase error correction circuitry and format conversion circuitry for converting the reproduced video signal from the "buried subcarrier format" (BSC) produced by Pritchard in U.S. Pat. No. 3,872,498 to an NTSC-like format. The advantages of buried subcarrier encoding of video disc records are well known and records recorded in such a format are commercially available, for example, from RCA Corporation. Carnt et al., in U.S. Pat. No. 4,200,881, describe suitable transcoders for the recording and reproduction of composite video signals for the PAL format.

The baseband audio signal produced by transcoder 18 is applied to the sound carrier modulation input of a TV modulator 20 which has an output terminal 22 coupled to the antenna input terminal of a television receiver 24. The composite baseband video signal is coupled via a signal combiner 26 (e.g., an adder or summing circuit) to a video output terminal 30 and to the video modulation input terminal of TV modulator 20 which produces modulated picture and sound carrier waves on a selected TV channel for reception by receiver 24. An integrated circuit suitable for use as modulator 20 is the model LM 1889 available, for example, from National Semiconductor, Inc.

A controller 40 (preferably microprocessor based as opposed to being implemented with random logic) provides various supervisory and information display control functions. The control functions (supplied via cable 42 to mechanism 10 and via cable 44 to transcoder 18) include, illustratively, control of the radial position, elevation, velocity and direction of movement of pickup transducer 14 relative to disc 12 and squelching or muting of the audio and video signals produced by transcoder 18. Some of the functions are initiated manually by means of a player control switch unit 46 coupled to an input port of controller 40. Manually initiated functions include, illustratively, play, pause, slow scan forward or reverse and rapid scan forward or reverse. Upon closure of one of the user activated switches in unit 46, controller 40 addresses its internal read only memory (ROM) and fetches an appropriate sequence of instructions resident in the memory for effecting the desired control function. For example, in the pause or rapid scan modes, controller 40 supplies a stylus lift signal via conductor 42 to mechanism 10 and a squelch signal to transducer 18 via conductor 44. The stylus lift signal activates a stylus lifter solenoid in mechanism 10 which lifts the stylus in transducer 14 from record 12 to avoid unnecessary wear. The squelch signal inhibits or mutes the audio and video output signal of transducer 18 to prevent noise produced when the stylus is in its lifted position from reaching modulator 20.

Information display functions of controller 40 include generation of playing time and caption data. Playing time is calculated from a video frame identification number present in the signal recovered from record 12 and is displayed on a two digit seven segment light emitting diode (LED) display 48 on the player. The caption data may correspond to the playing time, the frame numbers or to other messages encoded in the vertical interval of the recovered video signal and is processed for display by receiver 24 as will be explained.

Controller 40 is preferably of the kind described by C. B. Dieterich in U.S. patent application Ser. No. 084,393 filed Oct. 12, 1979 entitled "Video Disc System", now U.S. Pat. No. 4,308,557. Controller 40 receives clock and data signal from transcoder 18 and is preferably interfaced therewith by means of a PCM detector in transcoder 18 as described in C. B. Dieterich's U.S. Pat. No. 4,275,416 entitled "PCM Detector" which issued June 23, 1981. Other U.S. patent application which provide preferred methods of verifying the validity of the data, data framing, data recording, calculations or playing time from received data and transducer control include: "Video Disc Player System for Correlating Stylus Position with Information Previously Detected from Disc" Ser. No. 084,392 filed Oct. 12, 1979 by M. J. Mindel and J. C. Rustman, now U.S. Pat. No. 4,307,418; "Improved Digital on Video Recording and Playback System" Ser. No. 084,465 filed Oct. 12, 1979 by T. J. Christopher and C. B. Dieterich, now abandoned; "Improved Error Coding for Video Disc System" Ser. No. 084,396 filed Oct. 12, 1979 by T. J. Christopher, now U.S. Pat. No. 4,309,721; and "Track Error Correction System as for Video Disc Player" Ser. No. 084,386 filed Oct. 12, 1979 by J. C. Rustman and M. J. Mindel, now U.S. Pat. No. 4,313,134.

The caption display data produced by controller 40 is supplied to the input of a character dot generator 50 which receives high frequency (e.g., 3 MHz) clock signals from an oscillator 52 and produces a caption video output signal in raster scan dot matrix form when enabled by closure of a user activated display enable switch 54. The caption video signal comprises white level luminance signal pulses or "character dots" and is added to the composite video signal by means of combiner 26 for display along with associated picture information on receiver 24. Since the composite video signal (when present) includes all necessary timing signals (HS and VS components) for synchronizing receiver 24, generator 50 need only produce character dots and shading signals during the active scan time of the composite video signal. However, if HS or VS signals are present in the caption video signal produced by generator 50, they may be blocked (by means of diode coupling, for example) to avoid excess amplitude of the HS and VS components in the resultant combined signals produced at the output of combiner 26.

The caption video signal produced by generator 50 is synchronized at standard television line and field rates by means of horizontal (HS) and vertical (VS) synchronizing signals produced by a timing signal processor 60. The signals HS and VS are normally derived from the timing component of the composite video signal whereby the caption is maintained in registration with the "picture" image displayed on receiver 24. If the timing component of the composite video signal is interrupted for any reason (e.g., due to noise or video squelching) processor 60 produces and supplies substitute HS and VS timing signals to generator 50 and combines the substitute pulses to form a composite synchronizing signal CS which is added to the caption video output signal by means of combiner 26. The resultant signal produced by combiner 26, thus includes both an "active video" portion comprising the character dots and a timing signal portion comprising the substitute CS signal whereby the caption video signal may be continuously displayed on receiver 24 notwithstanding the interruption of the composite video signal.

Timing signal processor 60 includes an input terminal 62 for receiving the composite video signal produced by transcoder 18 and output terminals 64, 66, and 68 for providing, respectively, the aforementioned HS, VS, and CS timing signals. The horizontal timing signal, HS, for generator 50 is produced in processor 60 by means of a horizontal synchronizing signal (H-sync) detector 70 having an input connected to terminal 62 and an output connected to the reset input of a counter 74 and to one input of a two input OR gate 76. Counter 74 has a "full scale" or maximum count of "98" and is supplied with clock pulses of relatively high frequency (e.g., 1.53 MHz) selected such that the product (K) of the maximum count (Cm) times the clock signal (1/fcl) is slightly larger than the period (T) of the HS component of the composite video signal. This product determines the period of output pulses that will be produced by counter 74 (when not reset by detector 70) and may be expressed mathematically as:

$$K = Cm/fcl > T \quad (1)$$

For the illustrative values of Cm and fcl, the "free running" period, K, of counter 74 is approximately equal to 64.05 microseconds. This is slightly greater than one line scan interval (1−H) in the NTSC system (i.e., about 64 microseconds). Since counter 74 is reset by detector 70 at the normal NTSC line rate when the composite video signal is not squelched or otherwise interrupted, counter 74 will normally not reach its full scale count and will thus not produce output pulses. However, if the composite video signal should be interrupted, detector 70 will cease resetting counter 74 and the counter will then reach its full scale count and begin producing output pulses of substantially the same frequency as the missing or undetected HS timing pulses of the composite video signal.

The output of counter 74 is applied to the other input of OR gate 76 which is coupled to trigger a monostable multivibrator 78 having a quasi-stable period approximately equal to the sync tip interval of an NTSC horizontal synchronizing pulse (e.g., 3–4 microseconds). When the HS component of the composite video signal is present, multivibrator 78 is triggered by detector 70 but when the HS component of the composite video signal is interrupted, multivibrator 78 is triggered by counter 74. In either case, HS pulses of uniform width are produced by multivibrator 78 and supplied to output terminal 64 whereby horizontal synchronizing signals comprising either "true" or "substitute" pulses are continuously supplied to character generator 50.

The vertical timing signal, VS, for generator 50 is produced in processor 60 by means of a vertical synchronizing signal (V-sync) detector 80 having an input connected to terminal 62 and an output connected to the reset input of a counter 82 and to one input of a two input OR gate 84. Counter 84 has a full scale count of 264 which is slightly greater than the number of lines in one NTSC field (262.5 lines) and is clocked by the "true" or "substitute" HS pulses produced by multivibrator 78. Since the maximum count of counter 82 is greater than the number of lines in a standard field, counter 82 is normally reset by detector 80 before reaching its full count and thus produces no output pulses. If the composite video signal is interrupted, however, counter 82 will not be reset by detector 80 and will begin to produce output pulses of substantially the same frequency as the missing VS component of the composite video signal. Illustratively, if HS pulses are produced by multivibrator 78 at a frequency of 15750 Hz (an NTSC line rate) then counter 82 will produce "substitute" VS pulses at a rate of about 59.66 Hz when not reset by detector 80. This vertical field rate is slightly less than the NTSC rate of 60 Hz (monochrome standard) but is sufficiently close to the correct rate to synchronize conventional television receivers.

The "substitute" pulses produced by counter 82 are applied to a monostable multivibrator 86 having a quasi-stable state substantially equal to the NTSC vertical synchronizing interval (e.g., about 3 horizontal scan lines). The output of multivibrator 86 is connected to the other input of OR gate 84 which is connected at the output thereof to terminal 66. When the VS timing component of the composite video signal is present, OR gate 84 couples the "true" VS timing signals produced by detector 80 to terminal 66. Conversely, when the VS timing component of the composite video signal is interrupted, counter 82 triggers multivibrator 86 to produce "substitute" VS timing pulses which are coupled to terminal 66 via OR gate 84.

The "substitute" composite synchronizing signal CS synchronizes receiver 24 in the absence of "true" HS and/or VS components of the composite video signal and is produced in processor 60 by means of an exclusive-OR gate 90 having an output connected to terminal 68, a first input coupled to the output of counter 82 via VS monostable multivibrator 86 and a second input coupled via a second "HS" monostable multivibrator 92 to the output of counter 74. The period of multivibrator 92 is selected to be substantially the same as that of multivibrator 78 (e.g., 3-4 microseconds). In operation, counters 74 and 82 detect the absence of HS and VS components, respectively, of the composite video signal and produce substitute HS and VS pulses which are conditioned ("stretched") by means of multivibrators 92 and 86, respectively, so as to correspond to NTSC standard durations. Gate 90 forms the exclusive logical sum of the substitute pulses and supplies the resultant substitute composite synchronizing signal CS to combiner 26. The advantage of "exclusive-ORing" the substitute pulses is that the resultant CS signal will exhibit a serrated appearance during the vertical interval. This more nearly resembles a standard NTSC vertical synchronizing pulse than would result if, for example, one were to combine the substitute HS and VS pulses with an inclusive logical OR gate.

What is claimed is:
1. A video player, comprising:
  signal recovery means for producing a composite video output signal normally inclusive of vertical and horizontal timing pulses but being subject to partial or total interruption;
  first detector means for detecting the presence of said horizontal timing pulses;

second detector means for detecting the absence of said horizontal pulses;

third detector means for detecting the presence of said vertical timing pulses;

fourth detector means for detecting the absence of said vertical timing pulses;

character generator means for producing a caption video output signal;

means for applying a synchronizing signal to said generator means in response to activation of any one of said detector means; and means for combining said composite video signal, said caption video signal and output signals produced by the second and fourth detectors to provide a resultant video output signal in which missing ones of said timing pulses are replaced by respective substitute pulses.

2. Video player apparatus for use with a television receiver, said apparatus comprising:

signal recovery means for normally producing a composite video signal inclusive of timing pulses but being subject to partial or total interruption;

character generator means for producing a caption video signal;

timing signal processor means operative when said timing pulses are present for applying said timing pulses to said generator means to synchronize said caption video signal with said composite video signal and operative when said timing pulses of said video signal are interrupted for producing substitute pulses of substantially the same frequence as said timing pulses and for supplying said substitute pulses to said generator means to synchronize said caption video signal with said substitute pulses;

circuit means for combining said composite video signal, said caption video signal and said substitute pulses to provide a resultant video output signal in which missing ones of said timing pulses are replaced with corresponding ones of said substitute pulses;

output means for applying said resultant video output signal to an output terminal for connection to said television receiver whereby captions may be continuously displayed on said television receiver notwithstanding the partial or total interruption of said composite video signal produced by said signal recovery means; and wherein said processor means comprises:

(a) first means coupled to said signal recovery means for separating said timing pulses from said composite video signal;

(b) second means responsive to the absence of the separated timing pulses for producing said substitute pulses; and (c) third means for coupling said separated timing pulses to a synchronizing input of said character generator means and for coupling said substitute pulses to said synchronizing input of said character generator means.

3. Video player apparatus as recited in claim 2 wherein said second means comprises:

counter means having a first input for receiving a clock signal, a second input for receiving a reset signal and an output for providing said substitute pulses, said clock signal and the maximum count of said counter means being selected such that the free running period of said counter means, in the absence of said reset signal, is greater than the period of said separated timing pulses; and means for applying said separated timing pulses as said reset signal to said second input of said counter means for resetting said counter means to a given initial count upon the occurrence of each timing pulse produced by said first means.

4. Video player apparatus as recited in claim 2 wherein said third means comprises:

multivibrator means having an output coupled to said synchronizing input of said character generator means and a quasi-stable state substantially equal to the duration of said separated timing pulses; and means for triggering said multivibrator means in response to either said separated timing pulses or said substitute timing pulses.

5. Video player apparatus for use with a television receiver, said apparatus comprising:

said recovery means for normally producing a composite video signal inclusive of timing pulses but being subject to partial or total interruption;

character generator means for producing a caption video signal;

timing signal processor means operative when said timing pulses are present for applying said timing pulses to said generator means to synchronize said caption video signal with said composite video signal and operative when said timing pulses of said video signal are interrupted for producing substitute pulses of substantially the same frequency as said timing pulses and for supplying said substitute pulses to said generator means to synchronize said caption video signal with said substitute pulses;

circuit means for combining said composite video signal, said caption video signal and said substitute pulses to provide a resultant video output signal in which missing ones of said timing pulses are replaced with corresponding ones of said substitute pulses;

output means for applying said resultant video output signal to an output terminal for connection to said television receiver whereby captions may be continuously displayed on said television receiver notwithstanding the partial or total interruption of said composite video signal produced by said signal recovery means; and wherein said timing pulses comprise horizontal and vertical synchronizing pulses and said processor means comprises:

(a) first and second counter means, each having input, output and reset terminals;

(b) a source of clock signals coupled to the input terminal of the first counter means;

(c) means coupling the input and output terminals of the first counter means to the input terminal of the second counter means;

(d) means for applying said horizontal and vertical timing pulses to respective ones of the reset terminals of said first and second counter means; and (e) coupling means for coupling said output terminals of said counter means to said circuit means.

6. Video player apparatus as recited in claim 5 wherein said coupling means comprises gate means for forming the exclusive logical sum of signals supplied thereto.

7. A video player for use with a television receiver, said player comprising:

signal recovery means for normally producing a composite video signal including horizontal and vertical timing pulses but being subject to partial or total interruption;

character generator means responsive to an activation signal supplied thereto for producing a caption video signal;

timing signal processor means including first means for detecting said timing pulses, second means for coupling the detected timing pulses to said character generator means when said timing pulses are present to synchronize said caption video signal with said composite video signal, third means for detecting the absence of said timing pulses and for producing substitute timing pulses and fourth means for coupling said substitute pulses to said generator means to synchronize said caption video signal with said substitute timing pulses;

circuit means for combining said composite video signal, said caption video signal and said substitute pulses to provide a resultant video output signal in which missing ones of said timing pulses are replaced with corresponding ones of said substitute pulses; and wherein said third means comprises a cascade connection of first and second counters, means for applying a clock signal to the first counter of the cascade connection and means for resetting the first and second counters in response to respective ones of said horizontal and vertical timing pulses.

8. A video player as recited in claim 7 wherein said fourth means comprises first and second signal paths coupled between respective ones of said counters and said character generator means, each path including a respective monostable multivibrator means having a respective quasi-stable state.

9. A video player for use with a television receiver, said player comprising:

said recovery means for normally producing a composite video signal including horizontal and vertical timing pulses but being subject to partial or total interruption;

character generator means responsive to an activation signal supplied thereto for producing a caption video signal;

timing signal processor means including first means for detecting said timing pulses, second means for coupling the detected timing pulses to said character generator means when said timing pulses are present to synchronize said caption video signal with said composite video signal, third means for detecting the absence of said timing pulses and for producing substitute timing pulses and fourth means for coupling said substitute pulses to said generator means to synchronize said caption video signal with said substitute timing pulses;

circuit means for combining said composite video signal, said caption video and said substitute pulses to provide a resultant video output signal in which missing ones of said timing pulses are replaced with corresponding ones of said substitute pulses; and wherein said third means comprises separate detectors for detecting the absence of said horizontal and vertical timing pulses and further comprising fifth means for forming an output signal representative of the exclusive logical sum of output signals produced by the separate detectors and means for coupling the output signal of the fifth means to an input of said circuit means.

* * * * *